United States Patent [19]

Usher et al.

[11] Patent Number: 4,462,603
[45] Date of Patent: Jul. 31, 1984

[54] KNITTED WIRE MESH EXHAUST COUPLING SEAL WITH REFRACTORY METALLIC OXIDE IMPREGNANT

[75] Inventors: Peter P. Usher, Union; Eugene J. Gavaletz, Toms River, both of N.J.

[73] Assignee: Metex Corporation, Edison, N.J.

[21] Appl. No.: 476,553

[22] Filed: Mar. 16, 1983

[51] Int. Cl.³ .................. F16J 15/12; B32B 31/06
[52] U.S. Cl. ............................... 277/230; 277/1;
 277/30; 277/204; 277/233; 277/DIG. 6;
 29/520; 285/412; 285/DIG. 11; 264/258;
 264/324; 264/512; 264/516
[58] Field of Search ............ 277/1, 12, 30, 47, 48,
 277/101, 102, 105, 106, 204, 229, 230, 233, 234,
 235 R, 235 A, 235 B, 236, DIG. 6; 29/520;
 264/103, 257, 258, 248, 268, 273, 324, 501, 502,
 512, 516, 563; 285/187, 363, 368, 405, 412,
 DIG. 11, DIG. 18

[56] References Cited

U.S. PATENT DOCUMENTS

| 2,632,680 | 3/1953 | Smith | 277/212 C |
| 2,676,823 | 4/1954 | Olson et al. | 264/324 X |
| 2,924,471 | 2/1960 | Poltorak et al. | 277/230 X |
| 3,044,922 | 7/1962 | Kappel | 264/324 X |
| 4,097,071 | 6/1978 | Crawford et al. | 285/94 |
| 4,209,177 | 6/1980 | Hall | 277/101 |

FOREIGN PATENT DOCUMENTS

| 2829333 | 5/1979 | Fed. Rep. of Germany | 277/106 |
| 2912347 | 10/1980 | Fed. Rep. of Germany | 285/DIG. 11 |
| 1113320 | 5/1968 | United Kingdom | 264/324 |

Primary Examiner—Robert S. Ward

[57] ABSTRACT

A high temperature seal, particularly suitable for use in vehicle engine exhaust systems, is formed of a composite structure including a refractory metallic oxide impregnated into compressed knitted wire mesh. In a typical application, the seal is disposed between confronting ends of an engine exhaust manifold pipe and an exhaust tail pipe and permits relative rotation of the pipes without impairment of the effectiveness of the seal thereby preventing leakage of high temperature exhaust gasses passing through the joined pipes.

4 Claims, 7 Drawing Figures

U.S. Patent    Jul. 31, 1984    4,462,603
FIG. 1.
FIG. 2.
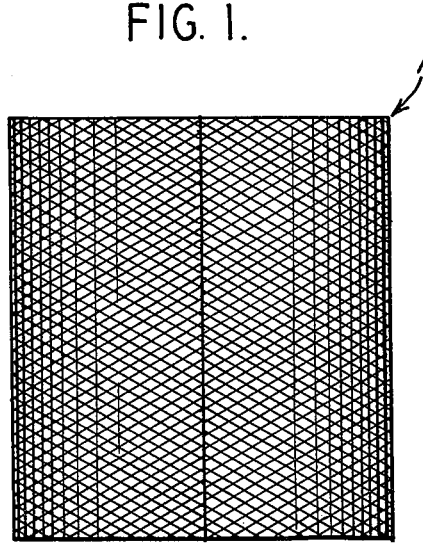
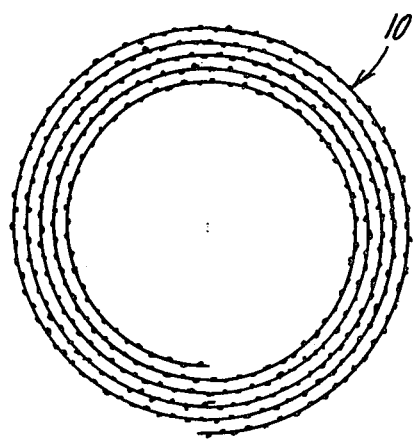
FIG. 3.
FIG. 4.
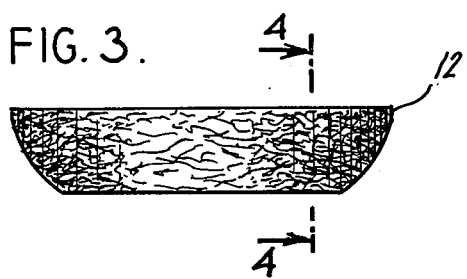
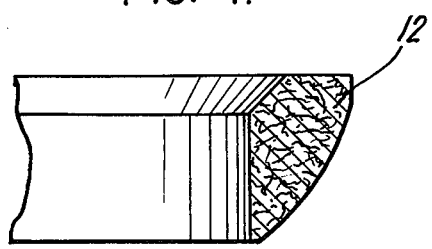
FIG. 5.
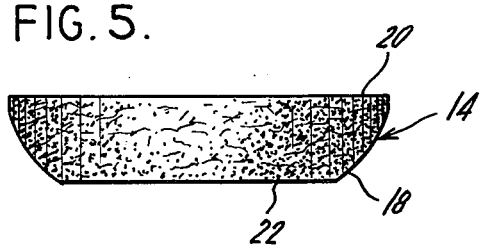
FIG. 6.
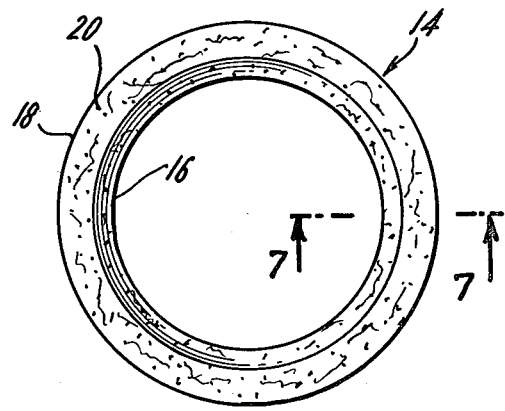
FIG. 7.
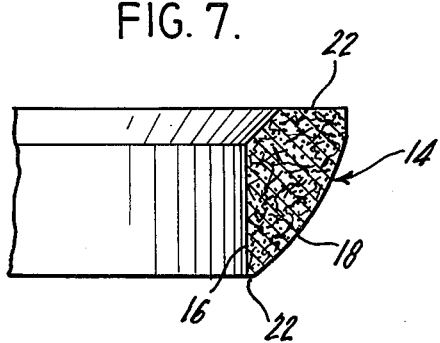

KNITTED WIRE MESH EXHAUST COUPLING SEAL WITH REFRACTORY METALLIC OXIDE IMPREGNANT

DESCRIPTION OF THE INVENTION

This invention relates generally to high temperature exhaust seals and, more particularly, to an exhaust seal in which a refractory metallic oxide is impregnated into compressed knitted wire mesh. The seal is especially useful in vehicle exhaust systems.

There are two general approaches to mounting a vehicle engine. In one approach, the engine is mounted so that its crankshaft runs longitudinally with respect to the vehicle body (hereinafter referred to as a longitudinally mounted engine). In the other approach, the engine is mounted so that its crankshaft runs transversely with respect to the vehicle body (hereinafter referred to as a transversely mounted engine). The latter arrangement is particularly useful for front wheel driven vehicles.

With regard to the exhaust systems appurtenant to these engines, it will be apparent that a particular exhaust system, which includes an engine exhaust manifold and tail pipe, will vary in its configuration depending upon the engine mounting orientation with respect to the vehicle, i.e., longitudinal or transverse.

For example, in the case of a longitudinally mounted engine, an exhaust manifold pipe extends from the engine exhaust manifold down alongside of the engine, and usually has a flange joined at its opened end which faces downward for connection to a mating flange on a tail pipe running beneath the vehicle. With this configuration, a seal is usually disposed between the connected flanges for preventing exhaust gas leakage out around the joined flanges. Movement of the exhaust manifold, such as caused by normal operation of the engine, is fully communicated to the tail pipe by way of the joined flanges. Stresses caused by the tail pipe movement are absorbed by flexible mountings (also known as hangers) which secure the tail pipe to the underside of the vehicle body. The typical exhaust seals therefore need not absorb any of these stresses and, because of this, they are of relatively simple construction. A typical seal used in longitudinally mounted engine applications is made of cast iron, and has tapered bearing surfaces which cooperate with the surfaces of the flanges to effect a tight seal. Other seals for these applications employ a laminate construction including asbestos and perforated sheet steel. Still other conventional seals may include impregnated asbestos yarn knitted within a wire mesh, these materials being pressed together to form the seal. In some instances, no seal is used at all, the flanges themselves effecting a sealed joint when connected together.

Transversely mounted engines, however, present a more difficult problem. Usually, the exhaust manifold pipe extends downward alongside the engine and has a flange at its opened end which also faces generally downward. However, normal engine operating movement resulting from rotational momentum of the crankshaft and opposing torsional forces of the driveshaft causes the exhaust manifold pipe flange to reciprocate in such a manner that the central axis of the pipe, which is perpendicular to the plane of the flange, departs from a substantially vertical line and becomes inclined alternately towards the front and rear of the vehicle. It is necessary to use a flexible joint between the exhaust manifold and the tail pipe to absorb this movement; otherwise it will be communicated directly to the tail pipe causing intolerable stresses and strains. Such stresses and strains can cause metal fatigue and accelerate failure of the tail pipe. Excessive noise can also be generated by vibrations induced by the stress reversals.

It will therefore be understood that with a transversely mounted engine, the exhaust seal in the flexible joint must be capable of permitting a degree of relative rotation between the exhaust manifold and tail pipes and still maintain an effective exhaust gas seal. Exhaust seals which are useful with longitudinally mounted engines are undesirable for use in vehicles having transversely mounted engines, because they cannot withstand the relative rotative movement and stress encountered in the flexible exhaust joints used with the latter. An example of a "ball and socket" type joint for a transversely mounted engine is shown in U.S. Pat. No. 4,097,071 issued June 27, 1978 entitled "Flexible Exhaust Coupling".

Vehicle exhaust systems currently utilize compressed knitted wire mesh seals to seal exhaust gas passages of the ball and socket joint of the exhaust system of a transversely mounted engine. These known seals use the following materials: (1) graphite sheet material combined with knitted wire wire mesh; (2) reconstituted mica paper combined with knitted wire mesh; or (3) asbestos yarn knitted in parallel with metallic wire.

The seals constructed using these materials are compressed to final shape and size in dies to high density. The non-metallic portions of each seal are mutually deformed and interlocked with the wire portions to provide a strong durable resilient and oxidation resistant seal which fulfills the requirements for a good exhaust seal.

Currently, the U.S. Government environmental control agencies are making the pollution controls specifications for automobiles and trucks more stringent. One of the techniques employed by design engineers to reduce pollution levels is to raise the temperature of exhaust gas, for example, to the vicinity of 1600 degrees F. At these elevated temperatures, the entire exhaust system glows bright red and any of the three seal constructions mentioned above can fail because the maximum allowable operating temperatures for the non-metallic portions of the seal are exceeded. For example, graphite begins to oxidize at approximately 700 degrees F., asbestos undergoes a destructive chemical transformation at 1200 degrees F., and certain forms of mica begin to deteriorate at approximately 1400 degrees F.

Accordingly, it is an object of the invention to provide an exhaust gas seal which will withstand the increased temperature of exhaust gases generated as a result of the effort to reduce pollution levels in the exhaust gases.

It is another object of the invention to provide such a seal fabricated from compressed knitted metal wire and impregnated with a refractory metallic oxide.

It is a specific object of the invention that the refractory metallic oxide be suspended in water or a volatile solvent along with a resin binder and appropriate wetting agents to form a homogeneous liquid solution of appropriate viscosity and solids content to serve as an impregnate to a compressed knitted wire mesh structure.

In accordance with a specific object of the invention, a sleeve of knitted wire mesh is first formed into a cylindrical preform and compressed in a compression die, the density of the compressed knitted wire mesh being made as high as practically possible, preferably within the range of 40% to 70% of the solid metal density, leaving a structure in which the wires are crushed and interlocked and openings remain between the wires. The final shape, size and structural integrity of the seal is fixed by the pressing operation. The wire can be of any stainless steel or metallic alloy capable of withstanding high temperatures and corrosive conditions, for example, Type 309 stainless steel (SS), Type 316 SS, or Inconel 600. The pressed knitted wire mesh is then impregnated with a refractory metallic oxide by either soaking the compressed knitted wire mesh in the refractory metallic oxide which is suspended in an appropriate impregnating liquid, or by forcing the refractory metallic oxide containing liquid into the voids in the mesh structure. The refractory metallic oxide can, for example, be titanium dioxide. The knitted wire mesh and refractory metallic oxide is then dried. One or more impregnating operations may be used as required, to sufficiently fill the voids in the knitted wire mesh.

In addition to operation at a higher temperature than previous exhaust seals, the exhaust seal according to the present invention exhibits high resiliency which makes it particularly suitable for use in flexible exhaust joints for vehicles having transversely mounted engines. This resiliency allows the seal to absorb a high degree of rotative stress when positioned within the flexible joint while maintaining an effective seal against exhaust gases passing through both of the joined pipes.

Other advantages for the exhaust seal of the present invention will be apparent from the following detailed description thereof with reference to the accompanying drawings, in which:

FIG. 1 is a front elevation view of a knitted wire mesh preform formed by convoluting a sleeve of knitted wire mesh;

FIG. 2 is a top elevational view of the knitted wire mesh preform of FIG. 1;

FIG. 3 is a front elevational view of the knitted wire mesh perform after compression in a compression die;

FIG. 4 is a partial section taken along line 4—4 of FIG. 3 and looking in the direction of the arrows;

FIG. 5 is a front elevational view of the seal after impregnation with a refractory metallic oxide;

FIG. 6 is a top elevational view of the exhaust seal shown in FIG. 5; and

FIG. 7 is a sectional view taken along line 7—7 in FIG. 6 and looking in the direction of the arrow.

In accordance with the invention, an exhaust seal for a vehicle exhaust system is provided by compressing a preform of knitted wire mesh to the size and shape of the final seal and impregnating the compressed knitted wire mesh with a refractory metallic oxide.

Referring to FIGS. 1 and 2, a cylindrical preform 10 of knitted wire mesh is formed by, for example, convoluting a sleeve of knitted wire mesh around a cylindrical mandrel. Although five convolutions are illustrated in FIG. 2, more or fewer convolutions can be used. The wires can be, for example, Type 309 SS, Type 316 SS, or Inconel 600 or other suitable metal. The preform is placed in a conventional compression die, not shown, and compressed to form a compressed knitted wire mesh seal 12, FIGS. 3, 4. The wires of compressed knitted wire mesh seal 12 are crushed and firmly interlocked. Although, it is preferable to compress knitted wire mesh preform 10 to as high a density as possible, as a practical matter, the density of seal 12 ranges from 40% to 70% metal with the remaining volume occupied by void between the metal wires. Compressed knitted wire mesh seal 12 is then impregnated with a refractory metallic oxide to form the impregnated seal 14, FIGS. 5, 6 and 7. The metallic refractory oxide fills the voids in the compressed knitted wire mesh seal 12 and coats the inner surface 16, the outer surface 18 and top and bottom surfaces 20, 22, respectively. In the preferred embodiment of the invention, the metallic refractory oxide is titanium dioxide suspended in a homogeneous liquid solution. Compressed knitted wire mesh seal 12 is dipped into the solution. The liquid penetrates the voids in the mesh and coats the surfaces of seal 12. Seal 12 is removed from the liquid and either allowed to air dry or is oven dried resulting in impregnated seal 14.

Impregnated seal 14 capable of operating at temperatures close to 2000 degrees F. is possible because of refractory metallic oxide from which the seal is fabricated. The highly compressed seal provides a very strong matrix of wire which is capable of withstanding all of the compressive forces encountered in use in an exhaust pipe joint. The seal 14 has a degree of resiliency which is useful in the automobile exhaust system in limiting the transmission of vibration and noise from the engine to the exhaust pipe downstream from the seal.

In the preferred embodiment, titanium dioxide is suspended in a water/acrylic-resin/polyester-resin solution. It is believed that the resin serves as a binder to hold the titanium dioxide within the compressed knitted wire matrix prior to exposure to the high temperatures encountered in the engine exhaust system and when so exposed, the resin binders decompose into ash without affecting the titanium dioxide which is capable of withstanding temperatures beyond the melting point of almost any metallic alloy used for the knitted mesh portion. Aside from mechanical entrapment of the titanium dioxide and ash particles within the knitted wire matrix it is also believed that there is a chemical bond between the titanium dioxide and the knitted wire which is accelerated by heat since chromium, a principal alloying component of most stainless steels, provides a protective layer of chromium oxide on the surface. When titanium dioxide and chromium oxide are heated together, the oxygen bonds are shared causing the physical bonding of the two oxides.

Following is a specific example describing in detail the formation of impregnated seal 14. Knitted mesh of 0.011 inch diameter Type 309A stainless steel wire in sleeve form, 2.5 inch wide is cut to a length of 36 inches. A preform is made by winding of the mesh on a mandril having a diameter of 1.82 inches. Five even wraps are made. The end is spot welded to maintain the preform for ease in handling. The preform is placed into a compression die having the cavity with the size and shape of the desired finished seal and is compressed using a 70 ton load to produce a knitted wire seal having a height of approximately 0.5 inches, outside diameter at the widest point of 2.53 inches and inside diameter of 1.79 inches. The knitted wire seal is then dipped in the metallic oxide impregnating solution. The impregnating solution contains the following basic formula:

|  | By Weight |
|---|---|
| Pigments | |
| $TiO_2$ | 23.2% |
| Silicates | 0.2% |

|  | By Weight |
| --- | --- |
| Tetrachloroisophthalonitrile | 0.3% |
| Vehicle | |
| Polyester Resin | 3.1% |
| Acrylic Resin | 16.9% |
| Volatile (Water) | 56.3% |

The basic formula is sold as Sears Best Weatherbeater House and Trim Acrylic Latex Paint, Exterior Satin Finish by Sears, Roebuck and Co.

The basic formula is used to form the impregnating solution by diluting the basic formula with 50% water so that the solution of 50% basic formula and 50% water by volume is formed. The compressed knitted wire seal is dipped into the impregnating solution for 30 seconds and then allowed to drip dry for 30 minutes at room temperature.

While there has been described a presently preferred embodiment of the invention, will be apparent to those skilled in the art that modification and changes can be made without departing from the spirit and scope of the invention which is set forth in the appended claims.

What is claimed is:

1. An impregnated seal, comprising knitted wire mesh compressed to the size and shape of the seal with the wire of the knitted wire mesh firmly interlocked to provide the seal with sufficient density and structural rigidity to withstand force applied to the seal in use and having voids between the wires and a refractory metallic oxide impregnated in the knitted wire mesh to fill the voids between the wires and coat the surface of the wires.

2. The seal of claim 1 wherein the metallic oxide is titanium dioxide.

3. The method of forming an impregnated seal comprising:

forming a cylindrical preform of knitted wire mesh;

axially compressing said preform in a compression die having a cavity the size and shape of the final seal causing the knitted wire to become firmly interlocked and having voids between the wires;

immersing the compressed knitted wire in a solution containing a refractory metallic oxide to permit the refractory metallic oxide to coat the surfaces of the knitted wire mesh and penetrate into the voids between the wires; and removing the coated knitted wire mesh from the solution and drying the coated knitted wire mesh to form an impregnated seal.

4. The method of claim 3 wherein said refractory metallic oxide is titanium dioxide.

* * * * *